Figure 1:
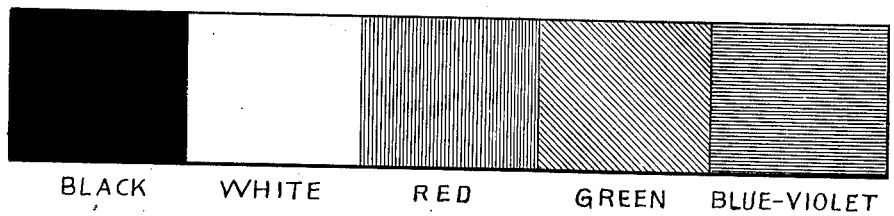

May 26, 1925.

L. D. MANNES ET AL 1,538,996

COLOR PHOTOGRAPHY

Filed Oct. 4, 1921

Object to be Photographed.

BLACK　　WHITE　　RED　　GREEN　　BLUE-VIOLET

After Exposure through red recorded negative. Toned blue

After Exposure through green recorded negative. Dye-toned red.

After Resensitizing and Exposing through diapositive made from blue recorded negative. Dyed yellow

INVENTOR

Patented May 26, 1925.

1,538,996

UNITED STATES PATENT OFFICE.

LEOPOLD D. MANNES AND LEOPOLD GODOWSKY, JR., OF NEW YORK, N. Y.

COLOR PHOTOGRAPHY.

Application filed October 4, 1921. Serial No. 505,266.

*To all whom it may concern:*

Be it known that we, LEOPOLD D. MANNES and LEOPOLD GODOWSKY, Jr., both citizens of the United States, and residents of the city, county, and State of New York, have invented certain new and useful Improvements in Color Photography; and we do hereby declare the following to be a full, clear, and exact description of the invention, such as will enable others skilled in the art to which it appertains to make and use the same.

This invention relates to the art of color photography and has for its object to provide an improved process for producing photographs, either paper prints or transparent films or slides, for projection in substantially the natural colors of the original objects or scenes.

Our invention also includes the improved photographic color print or transparency resulting from our improved process.

We prefer to practice our invention as a three-color process, for the reason that natural colors cannot be reproduced with substantial accuracy with less than three primary colors. With three colors varying in intensity substantially with the degree of the corresponding color sensation in the natural colors of the scene photographed, the tone colors of the objects will be substantially reproduced even to slight variations in the tones and shading of the color.

Heretofore the best results in color photography by this overlaying of the three primary colors have been obtained by projecting three separate pictures on the screen, but this process is open to the serious defect that it is practically impossible to match accurately the three projected pictures on the screen in the commercial presentation of pictures, and an improper matching of the pictures produces "color fringes" at the edges of the figures in the picture which detract greatly from the appearance of the picture even though the colors may be otherwise faithfully reproduced. It has therefore been proposed to produce pictures in colors by printing upon one surface successive prints from separate simultaneously taken negatives of different color values of the scene to be reproduced, the prints being differently dyed or otherwise colored to reproduce the color values in the scene. So far as we are aware, however, no such pictures have as yet been produced satisfactorily on a commercial scale, and such processes as have heretofore been proposed have been two-color processes with which only approximate results can at best be secured.

The principal object of our invention is to produce a picture of this kind, either a transparent projection film or an ordinary photographic print, using three original negatives of different color values, with the three colors reproduced in the same emulsion in such manner as to substantially reproduce the natural colors of the scene or object photographed.

Figure 2:
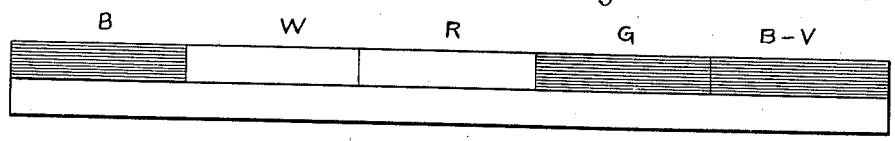
Figure 3:
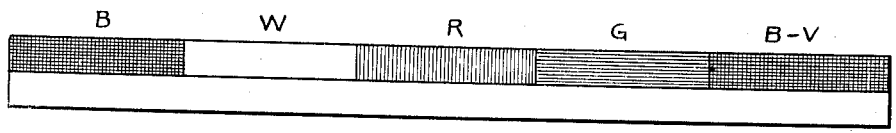
Figure 4:
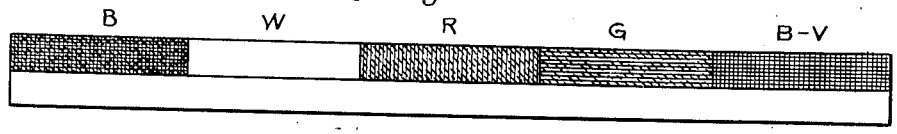

We have illustrated a preferred embodiment of our invention in the accompanying drawings in which Figure 1 is a view illustrating the object photographed here shown as a series of rectangular squares colored black, white, red, green and blue-violet respectively; Figure 2 shows the plate after exposure thru the red recorded negative; Figure 3 shows the plate after exposure thru the green recorded negative and Figure 4 shows the finished plate after resensitizing and exposure thru the blue recorded negative.

In carrying out our process, for example, for the production of a lantern slide for projection in an ordinary stereopticon, we proceed as follows: The three negative plates of the scene to be pictured are simultaneously taken by means of a suitable camera, preferably of the kind which effects the three exposures through a single light opening, so that the three pictures will match perfectly when printed on the same slide. The three pictures are taken through suitable color filters so as to produce the red, green and blue sensation negatives commonly employed in three-color process work.

For the lantern slide an ordinary glass plate provided with the usual single silver bromid gelatin emulsion for black and white slides is used. The first step in the process is to expose the plate under the red color sensation negative. We will refer to this negative as negative A and the print produced from it as print A. The time of exposure should be about two-thirds the time ordinarily given for a full black and white print, to leave thereby a portion of the silver salt unaffected by the light. After exposure the plate is developed in the usual manner and washed. The next step in the process is to bleach the resultant image by immersing the plate in a solution of potassium ferricyanide. The plate is then washed thoroughly again and the image is toned by immersion in a solution of ferric chloride containing free hydrochloric acid. By this step the bleached image is colored with so-called ferric or Prussian blue. As indicated in Figure 2, the blue image is formed in that portion of the film recording the black, the green and the blue-violet of the object photographed.

The plate is washed in a weak solution of sodium thiosulfate, for instance, a two and one-half per cent solution used for about one minute to remove the precipitated ferricyanide salts without affecting the unreduced silver bromide left on the plate by the original partial exposure.

The plate now consists of a transparent blue print made from the red color sensation negative. By red color sensation negative is meant a negative taken through a red filter which filters out or obstructs to the greatest extent the passage of the rays of the color complementary to the filter. Hence, by coloring the print with the color chiefly obstructed by the filter, the intensity of the print in its different parts varies in proportion to the intensity of that element in the colors of the figures and objects of the scene.

After the transparent blue print is thus produced there is still remaining a portion of sensitive silver bromide. After the last washing of the plate in producing the blue print it is dried and when dry is exposed under the green sensation negative which, together with the print produced by it, will be designated as negative and print B, respectively. The exposure for printing the second print must be about 150 times as long as a normal exposure, for the reason that the silver salt has been considerably desensitized during the process of producing the A print. The second, or B, print, is then developed with a diamidophenol developer as it requires no alkali and the diamidophenol attacks the blue image much less vigorously than an ordinary developer. The development of the B image has the effect of bleaching the A image. The next step is to wash the plate and fix completely in a strong sodium thiosulfate solution. After the B image is fixed, the A image is restored by immersing the plate in a copper ferrocyanide toning solution of the usual formula. This toning solution not only restores the blue color to the A image, but mordants the B image and tones it pink.

The plate is then washed again in sodium thiosulfate solution in order to render the B image also transparent. Both images are now transparent and the A image is full blue color while the B image is a pale pink.

The plate is then washed to remove the free sodium thiosulfate and is next immersed in an aqueous solution of a basic red dye and acetic acid. The B image having been mordanted, takes up the dye in ratio to the density of the image, while the A image remains unaffected. The plate is then washed with a weak solution of acetic acid and water to remove the excess dye, thereby completing this step of the process, which gives a plate having the blue color values in the scene reproduced in Prussian blue and the red color values reproduced in magenta. As shown in Figure 3, the red color values are recorded in that portion of the emulsion which records the black, the red and the blue-violet of the object photographed. In that portion of the emulsion containing both a red image and a blue image, the two images both extend throughout the greater portion of the emulsion and it is not possible to indicate a definite dividing line between the respective images.

The silver salt in the emulsion has now been entirely exposed, developed and dyed, so that to obtain the third image it is necessary to sensitize the emulsion again. This we accomplish preferably by immersing the plate in a potassium bichromate solution and then drying to receive the third print from the blue sensation negative which we will call print and negative C. Instead of using the C negative directly for the third exposure we use a diapositive made from the C negative, for the reason that the gelatin is hardened by the light action, thereby reducing the capacity of the gelatin to take up dye. The plate is then immersed for a short interval in a strong aqueous solution of acid yellow dye which will be absorbed into the gelatin in inverse proportion to the action of light, i. e., in direct ratio to the density of the diapositive C. The plate is then washed to remove the surplus dye, and dried, thereby completing the process. The finished plate is illustrated in Figure 4. The portion of the emulsion recording the black of the object photographed is a composite record consisting of the blue, the red and the yellow images. These respective images are associated intimately in the emulsion with each other. That portion of the film recording the white of the object contains no color; that portion recording the red contains the red (or magenta) and the yellow image; that portion recording the green contains the yellow and the blue images; and that portion recording the blue-violet contains the blue and the red images.

The plate so produced has on it, i. e., in the single layer of emulsion, three images printed in the colors complementary to the three filters through which the negatives were exposed, thereby accurately producing in the print the varying values of the component colors in the scene photographed.

The slide so produced may be projected in an ordinary stereopticon and requires no more light than the usual black and white slide. In fact, our experience shows that due to the contrasting colors, thinner prints may be employed without losing definition than in the case of ordinary black and white pictures.

The process has been described for convenience in connection with the production of lantern slides, but it will of course be understood that the process is equally applicable to the production of colored motion picture films, care being necessary in all cases to register accurately the negatives and the plates or films in printing the successive images on the plate or film.

Our improved process is also applicable to the production of paper prints, the same procedure being followed as with glass plates except that the paper carrying the sensitive emulsion should be thoroughly water-proof to prevent absorption of the various solutions and spreading of the dyes.

We claim:

1. The method of producing a color photograph from suitable color selection negatives which consists in first forming one color image within the body of a layer of material containing a light-sensitive substance by the action of a portion only of said substance, then forming a second color image within the same layer of material by the action of a further portion of the light-sensitive substance, and thereafter re-sensitizing said layer of material and producing a third color image in the body of the same layer of material by the action of the re-sensitizing substance.

2. The method of producing a color photograph from suitable color selection negatives which consists in first forming one color image within the body of a layer of material containing a light-sensitive substance by the action of a portion only of said substance, then forming a second color image within the same layer of material by the action of a further portion of the light-sensitive substance, and thereafter re-sensitizing said layer of material with a light-sensitizing substance of a different character and producing a third color image in the body of the same layer of material by the action of the re-sensitizing substance.

3. The method of producing a color photograph from suitable color selection negatives which consists in first forming one color image within the body of a layer of material containing a light-sensitive silver salt by the action of a portion only of said silver salt, then forming a second color image within the same layer of material by the action of a further portion of the silver salt, and thereafter re-sensitizing said layer of material with a sensitizer of a different character and producing a third color image in the body of the same layer of material by the action of the re-sensitizing substance.

4. The method of producing a color photograph from suitable color selection negatives which consists in first forming one color image within the body of a layer of material containing a light-sensitive silver salt by the action of a portion only of said silver salt, then forming a second color image within the same layer of material from the action of a further portion of the silver salt, and thereafter re-sensitizing said material with a potassium bichromate solution and producing a third color image in the body of the layer of material by the action of said bichromate solution.

In witness whereof we have hereunto affixed our signatures.

LEOPOLD D. MANNES.
LEOPOLD GODOWSKY, Jr.